F. HASKEL.
SHIM.
APPLICATION FILED DEC. 24, 1917.
1,379,816.
Patented May 31, 1921.
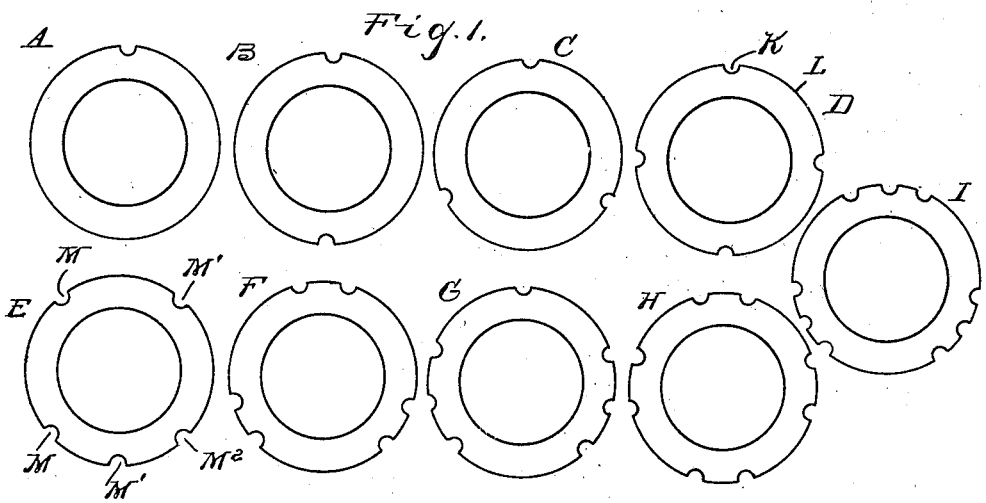
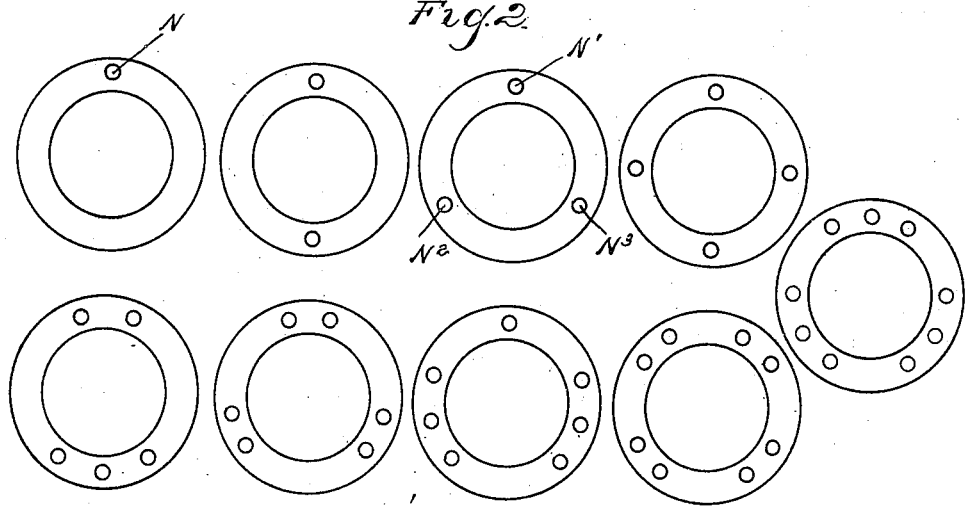
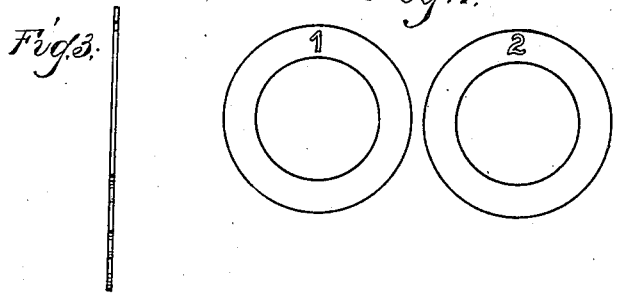
Inventor
Fred Haskel
By Whittemore Hulbert Whittemore
Attorneys

UNITED STATES PATENT OFFICE.

FRED HASKEL, OF DETROIT, MICHIGAN.

SHIM.

1,379,816.   Specification of Letters Patent.   Patented May 31, 1921.

Application filed December 24, 1917.  Serial No. 208,663.

*To all whom it may concern:*

Be it known that I, FRED HASKEL, a citizen of the United States of America, residing at Detroit, in the county of Wayne and State of Michigan, have invented certain new and useful Improvements in Shims, of which the following is a specification, reference being had therein to the accompanying drawings.

This invention relates to a shim and refers more particularly to a novel construction and arrangement of parts for indicating the particular gage of the shim.

The chief object of the invention is to provide a system or arrangement for marking the shims so that the user can readily determine the particular gage of the shim, the marking being applied in such a way as to avoid altering the thickness of the shim.

The invention also resides in such details of construction and arrangements and combinations of marking as will more fully hereinafter appear.

In the drawings:

Figure 1 is an elevational view of a set of shims embodying my invention;

Fig. 2 is a similar view showing a modified construction of marking;

Fig. 3 is an enlarged end elevational view of one of the shims shown in Fig. 1;

Fig. 4 is an elevational view showing a still further modification.

Describing in detail the sets of shims disclosed in the drawings and referring first to the particular embodiment of my invention shown in Fig. 1, A B C D E F G H and I designate a set of shims which, in this particular case, are of thicknesses varying from one thousandth of an inch to nine thousandths of an inch. With shims of such small thicknesses, particularly those of the smallest gage, difficulty is encountered in picking out the right thickness of shim and also in sorting them out or replacing them. Because of the extreme thinness of the metal it is impossible to mark or stamp the gage into the metal without varying the thickness. With the present invention the shims are marked by a series of notches K stamped out or otherwise formed in the periphery L of each of the shims.

In order to permit of readily determining the gage of any particular shim the following novel system of marking is employed: The shim which is of one thousandth thickness has no notches or only one notch punched therein; the shim of two thousandths thickness has two notches punched on opposite sides; the shim of three thousandths thickness has three notches; that of four thousandths thickness has four notches distributed around the periphery. For those shims of five thousandths or greater thickness the notches are arranged in series so as to permit the total number being more quickly noticed by the eye. Thus the shim of five thousandths thickness has three notches M, M' and M² on one side and two notches M, M' on the other side. The shim of six thousandths thickness has three pairs of notches distributed around the periphery. The shim of seven thousandths thickness has two sets of three notches and one separate notch. The shim of eight thousandths thickness has four pairs of notches distributed around the periphery, while the shim of nine thousandths thickness has three sets of three notches each distributed around the periphery.

In the set of shims shown in Fig. 2 the distribution of the identification marks corresponds to that above described in connection with Fig. 1, except that in place of notches formed in the periphery of the shim I stamp out or otherwise form a hole N or a series of holes N', N², N³, etc. With either construction the machinist using the shims can easily determine the exact thickness of the shim while the identification mark does not in any way vary the thickness as it would in case the marks were stamped into the metal.

In case it is desired to use figures I may employ the construction shown in Fig. 4 in which the numerals themselves are completely stamped out from the body of the metal. The invention, however, is not limited to the particular forms of identification marks shown, nor to the particular arrangement or grouping of the marks except as ultimately set forth in the claims.

With any of the forms of marking as above disclosed the thickness of the shim can be readily observed by the marking, and the latter is produced without in any way affecting a variation in the thickness of the shim. With the ordinary forms of marking such as cutting in or stamping into the metal the figures representing the thickness of the metal a variation would be produced in the thickness of the shim. Moreover with the narrower gaged shims the marking that could be applied would be so faint as would be of little value for practical purposes, while shims marked as above described are particularly useful in connection with the arbors of milling cutters or the like but the invention is applicable for shims used for all kinds of purposes.

What I claim as my invention is:—

1. A set of metal shims comprising a plurality of shims of different thicknesses and identification marks formed by completely stamping out a portion of the body of the metal.

2. A set of metal shims comprising a plurality of shims of different thicknesses and identification marks formed by completely stamping out a portion of the body of the metal, said marks being distributed in groups around the shim.

3. A set of metal shims having their thicknesses varying by a constant differential, and identification marks formed in said shims indicating by their number the multiple of said differential which is the thickness of the shims.

4. A set of metal shims comprising a plurality of shims of different thicknesses, at least one which is of relatively small thickness, such shims having permanent identification marks formed therein to indicate the thickness of the particular shim to which the mark is applied while maintaining a uniform thickness of the shim throughout.

In testimony whereof I affix my signature.

FRED HASKEL.